(12) United States Patent
Awatsu

(10) Patent No.: US 11,816,378 B2
(45) Date of Patent: Nov. 14, 2023

(54) INFORMATION PROCESSING APPARATUS, INFORMATION PROCESSING METHOD, AND NON-TRANSITORY COMPUTER READABLE MEDIUM THAT SIMPLIFY OPERATION FOR SERIAL EXECUTION OF MULTIPLE TYPES OF PROCESSES

(71) Applicant: FUJIFILM Business Innovation Corp., Tokyo (JP)

(72) Inventor: Yusaku Awatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 16 days.

(21) Appl. No.: 17/544,948

(22) Filed: Dec. 8, 2021

(65) Prior Publication Data

US 2023/0066569 A1 Mar. 2, 2023

(30) Foreign Application Priority Data

Aug. 26, 2021 (JP) .................................. 2021-137873

(51) Int. Cl.
*G06F 3/12* (2006.01)
*H04N 1/34* (2006.01)
*H04N 1/00* (2006.01)
*H04N 1/32* (2006.01)
*H04N 1/327* (2006.01)
*G06K 7/14* (2006.01)
*G06Q 20/14* (2012.01)

(52) U.S. Cl.
CPC .......... *G06F 3/1272* (2013.01); *G06F 3/1203* (2013.01); *G06F 3/1293* (2013.01); *G06K 7/1417* (2013.01); *G06Q 20/14* (2013.01); *H04N 1/00334* (2013.01); *H04N 1/34* (2013.01); *H04N 1/342* (2013.01); *H04N 1/344* (2013.01); *H04N 1/346* (2013.01); *H04N 1/32101* (2013.01); *H04N 1/32778* (2013.01)

(58) Field of Classification Search
None
See application file for complete search history.

(56) References Cited

U.S. PATENT DOCUMENTS

| 2003/0002056 A1* | 1/2003 | Yamaguchi | G06K 15/00 358/1.15 |
| 2003/0129970 A1* | 7/2003 | Kawaoka | B41J 3/44 455/412.1 |
| 2009/0238599 A1* | 9/2009 | Kim | G03G 21/02 399/79 |

(Continued)

FOREIGN PATENT DOCUMENTS

| JP | 2020027965 | 2/2020 |
| JP | 2020031350 | 2/2020 |

*Primary Examiner* — Miya J Cato
(74) *Attorney, Agent, or Firm* — JCIPRNET

(57) ABSTRACT

An information processing apparatus includes: a processor configured to: in response to acquiring a first identification output from a different information processing apparatus, perform control of execution of a first process; in response to completion of the first process, perform control to cause the different information processing apparatus to output a second identification for executing a second process; and in response to acquiring the second identification output from the different information processing apparatus, perform control of execution of the second process.

17 Claims, 13 Drawing Sheets

(56) References Cited

U.S. PATENT DOCUMENTS

| | | | |
|---|---|---|---|
| 2015/0036176 A1* | 2/2015 | Naruse | H04N 1/00925 358/1.15 |
| 2015/0212770 A1* | 7/2015 | Song | G06F 3/1222 358/1.15 |
| 2016/0098237 A1* | 4/2016 | Nakatsu | H04N 1/00204 358/1.15 |
| 2020/0065638 A1 | 2/2020 | Nakai et al. | |
| 2021/0337075 A1* | 10/2021 | Nakamura | G07F 17/266 |

* cited by examiner

FIG. 13

| IMAGE ID | STORAGE PLACE AND FILE NAME | OUTPUT SHEET SIZE | COLOR MODE | THE NUMBER OF PRINT COPIES |
|---|---|---|---|---|
| 00000001 | D:\Data\00000001.pdf | A4 | Color | 1 |
| 00000002 | D:\Data\00000002.xdw | A3 | Mono | 15 |
| 00000003 | D:\Data\DSC2001.jpeg | L | Color | 1 |

INFORMATION PROCESSING APPARATUS, INFORMATION PROCESSING METHOD, AND NON-TRANSITORY COMPUTER READABLE MEDIUM THAT SIMPLIFY OPERATION FOR SERIAL EXECUTION OF MULTIPLE TYPES OF PROCESSES

CROSS-REFERENCE TO RELATED APPLICATIONS

This application is based on and claims priority under 35 USC 119 from Japanese Patent Application No. 2021-137873 filed Aug. 26, 2021.

BACKGROUND

(i) Technical Field

The present disclosure relates to an information processing apparatus, an information processing method, and a non-transitory computer readable medium.

(ii) Related Art

To date, there have been disclosed technologies for enhancing convenience for a user who performs an operation for providing an information processing apparatus that executes a process corresponding to an identification with the identification required for the process (for example, Japanese Unexamined Patent Application Publication No. 2020-027965).

SUMMARY

However, to cause the information processing apparatus that executes a process corresponding to an identification to execute multiple types of processes serially, an identification for executing a first process is required, and then an identification for executing a second process is required in some cases. For example, a user is required to present, to a multifunctional copier that executes a printing process and a settlement process, a settlement identification for the settlement process and a printing identification for the printing process in order on occasions. In such a case, it takes the user effort to cause a smartphone or the like to display, on the screen thereof, the printing identification and then the settlement identification changed from the printing identification.

Aspects of non-limiting embodiments of the present disclosure relate to a simplified operation for serial execution of multiple types of processes compared with a case where an operation is performed for every process.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to: in response to acquiring a first identification output from a different information processing apparatus, perform control of execution of a first process; in response to completion of the first process, perform control to cause the different information processing apparatus to output a second identification for executing a second process; and in response to acquiring the second identification output from the different information processing apparatus, perform control of execution of the second process.

BRIEF DESCRIPTION OF THE DRAWINGS

An exemplary embodiment of the present disclosure will be described in detail based on the following figures, wherein:

FIG. 13 is a table illustrating a specific example of image information stored in the database of a storage of the management server.

DETAILED DESCRIPTION

Hereinafter, an exemplary embodiment of the present disclosure will be described in detail with reference to the attached drawings.

Configuration of Information Processing System

Figure 1:
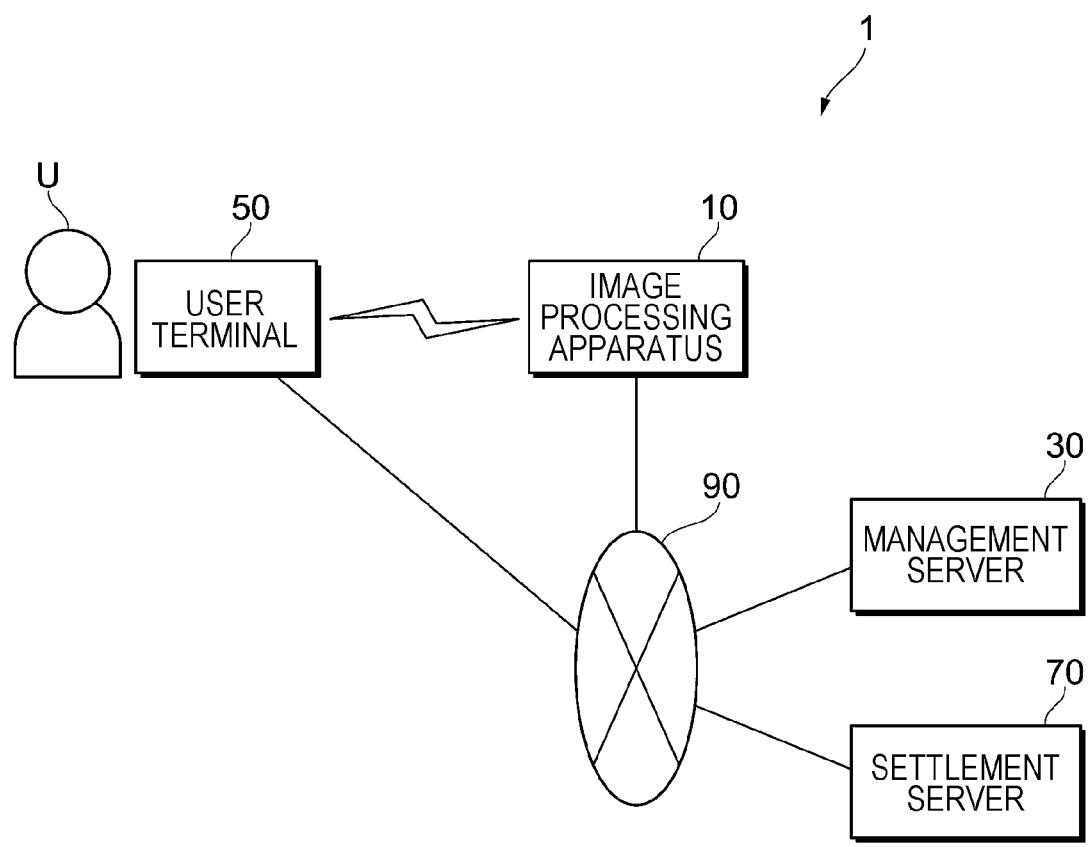
FIG. 1 is a diagram illustrating the overall configuration of an information processing system to which this exemplary embodiment is applied.

FIG. 1 is a diagram illustrating the overall configuration of an information processing system 1 to which this exemplary embodiment is applied.

The information processing system 1 includes an image processing apparatus 10, a management server 30, a user terminal 50, and a settlement server 70 that are connected via a network 90. Examples of the network 90 include a local area network (LAN), the Internet, and a telephone network. The image processing apparatus 10 and the user terminal 50 may be directly connected to each other without the network 90 by using a communication mode such as an infrared-ray communication mode, a visible light communication mode, a proximity wireless communication mode, Bluetooth (registered trademark), or radio frequency identification (RFID) (registered trademark). Although FIG. 1 illustrates only one settlement server 70, multiple settlement servers 70 may be connected to the network 90.

The image processing apparatus 10 is an apparatus having functions of forming an image on a recording medium, reading an image formed on the recording medium, and transmitting and receiving image information through communication. The image information includes data regarding an image to be formed on the recording medium and information required to form the image on the recording medium. Examples of the information required to form the image on the recording medium include the size of a recording medium to be output, a color mode (for example, a full color mode or a monochrome mode) used in forming the image, and the number of print copies to be output. In this exemplary embodiment, the recording medium is a paper sheet. The image processing apparatus 10 provides a user U with various services using these functions.

Examples of the services provided by the image processing apparatus 10 include a printing service, a copying service, a scanning service, and a faxing service. In the printing service, the image processing apparatus 10 acquires image information, forms an image based on the image information on the paper sheet, and outputs the image. In the copying service, the image processing apparatus 10 reads an image formed on the paper sheet, forms an image based on image information regarding the read image, and outputs the formed image on the paper sheet. In the scanning service, the image processing apparatus 10 reads an image formed on the paper sheet and stores information regarding the image in a storage medium such as a universal serial bus (USB) memory. In the faxing service, the image processing apparatus 10 reads an image formed on the paper sheet and faxes the read image to a specified designation outside the image processing apparatus 10. In this exemplary embodiment, a case where the printing service is provided among the various services will be described taken as an example.

The printing service provided by the image processing apparatus 10 is a fee-charging service. The image processing apparatus 10 thus executes an image forming process for providing the printing service and a settlement process for settling the service fee of the printing service. Specifically, the image processing apparatus 10 acquires an identification for the image forming process serving as a first process from the user terminal 50 and executes the image forming process corresponding to the identification. Thereafter, the image processing apparatus 10 acquires an identification for the settlement process serving as a second process from the user terminal 50 and executes the settlement process corresponding to the identification.

In this exemplary embodiment, the identification is a code. Examples of the code include a two-dimensional code such as a QR code (registered trademark). Hereinafter, a code serving as an identification for the image forming process is referred to as an image forming process code, and a code serving as an identification for the settlement process is referred to as a settlement process code. Image information and an image identification (ID) that uniquely identifies the image information are associated with an image forming process code. Settlement information and a settlement ID that uniquely identifies the settlement information are associated with a settlement process code. The settlement information includes at least an amount of money to be settled (settlement amount). The settlement information may also include information that uniquely identifies the user U who performs the settlement, information regarding a payment method, and other pieces of information.

The management server 30 is an information processing apparatus serving as a server that performs overall management of the information processing system 1. The management server 30 acquires image information from the user terminal 50. The management server 30 generates an image forming process code as an identification for the acquired image information and transmits the generated image forming process code to the user terminal 50. The management server 30 associates the generated image forming process code with an image ID and image information and manages the image forming process code, the image ID, and the image information. The image information managed by the management server 30 is provided to the image processing apparatus 10 in response to a request from the image processing apparatus 10.

The user terminal 50 is an information processing apparatus used by the user U, such as a smartphone, a personal computer, or a tablet terminal. The user terminal 50 provides the management server 30 with image information for an image forming process by the image processing apparatus 10. The user terminal 50 acquires the image forming process code from the management server 30 and outputs the image forming process code. The user terminal 50 requests the settlement server 70 to transmit a settlement process code.

The settlement server 70 is an information processing apparatus serving as a server that settles the service fee of the printing service provided by the image processing apparatus 10. The settlement server 70 transmits the settlement process code to the user terminal 50 in response to the request from the user terminal 50. After the image processing apparatus 10 requests the settlement server 70 to execute a settlement process based on settlement information associated with the settlement process code, the settlement server 70 executes the settlement process and transmits information indicating the completion of the settlement process to the image processing apparatus 10.

Hardware Configuration of Image Processing Apparatus

Figure 2:
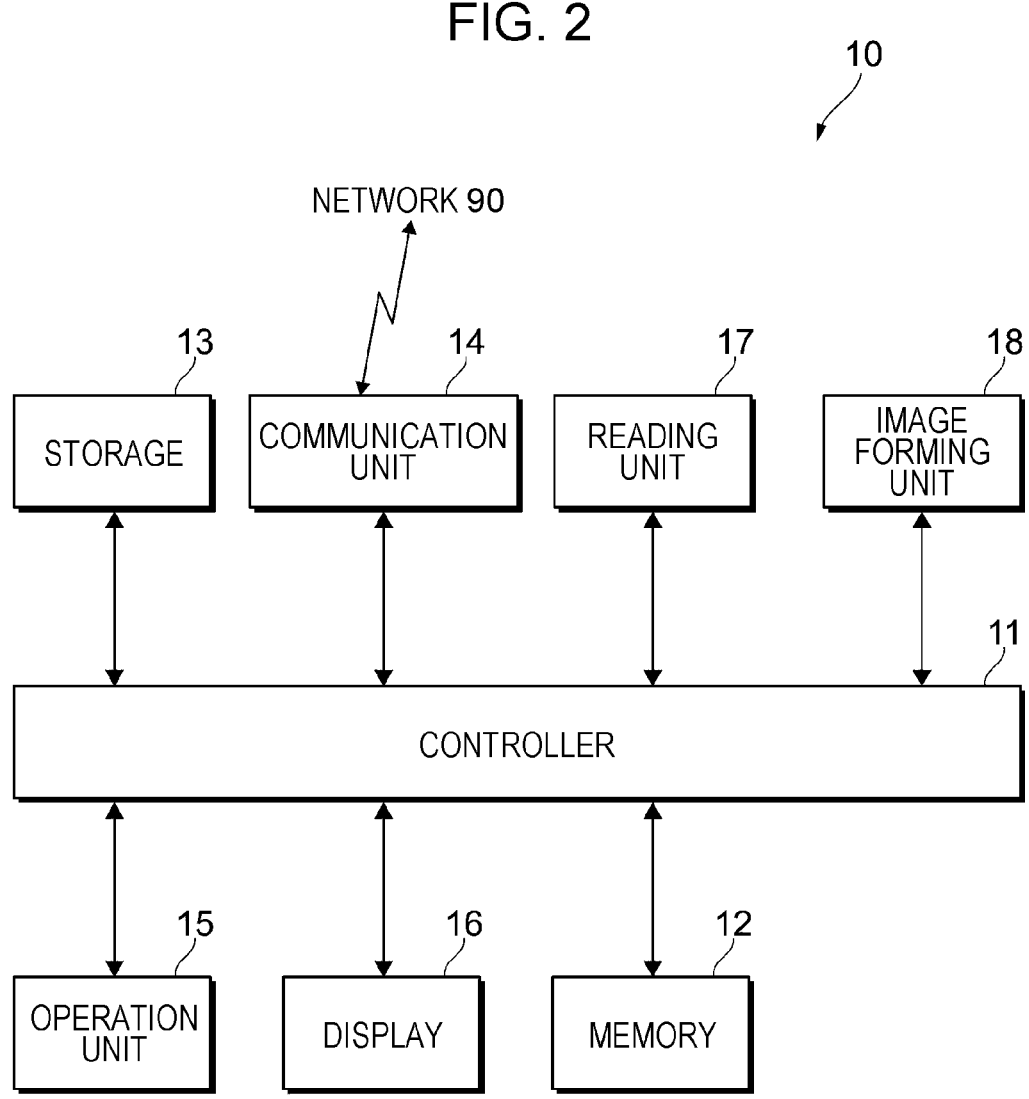
FIG. 2 is a diagram illustrating the hardware configuration of an image processing apparatus.

FIG. 2 is a diagram illustrating the hardware configuration of the image processing apparatus 10.

The image processing apparatus 10 includes a controller 11, a memory 12, a storage 13, a communication unit 14, an operation unit 15, a display 16, a reading unit 17, and an image forming unit 18. These components are connected via a data bus, an address bus, a peripheral component interconnect (PCI) bus, or the like.

The controller 11 is a processor configured to perform control of the operation of the image processing apparatus 10 by running software such as the operating system (OS) (basic software) or application software. The controller 11 is configured as, for example, a central processing unit (CPU). The memory 12 is a memory area used to store various pieces of software and data used for running the pieces of software. The memory 12 is used as a work area in arithmetic operations. The memory 12 is configured as, for example, a random access memory (RAM).

The storage 13 is a memory area used to store data and the like input and output to and from various pieces of software. The storage 13 has a database storing various pieces of information. The storage 13 is configured as, for example, a hard disk drive (HDD), a solid state drive (SSD), or a semiconductor memory that is used to store programs, pieces of set data, and the like.

The communication unit 14 transmits and receives data via the network 90 or by using a communication mode such as the infrared-ray communication mode. The communication unit 14 transmits and receives the data to and from the management server 30, the user terminal 50, the settlement server 70, and an external apparatus. If the network 90 is a telephone network, the communication unit 14 transmits and receives a document to and from the external apparatus by faxing.

The operation unit 15 is composed of, for example, a keyboard, a mouse, mechanical buttons, and a switch and receives an input operation. The operation unit 15 includes a touch sensor forming a touch panel integrally with the display 16. The display 16 displays an image, text information, and the like. The display 16 is composed of, for example, a liquid crystal display or an organic electro luminescence (EL) display that is used for displaying information.

Figure 4:
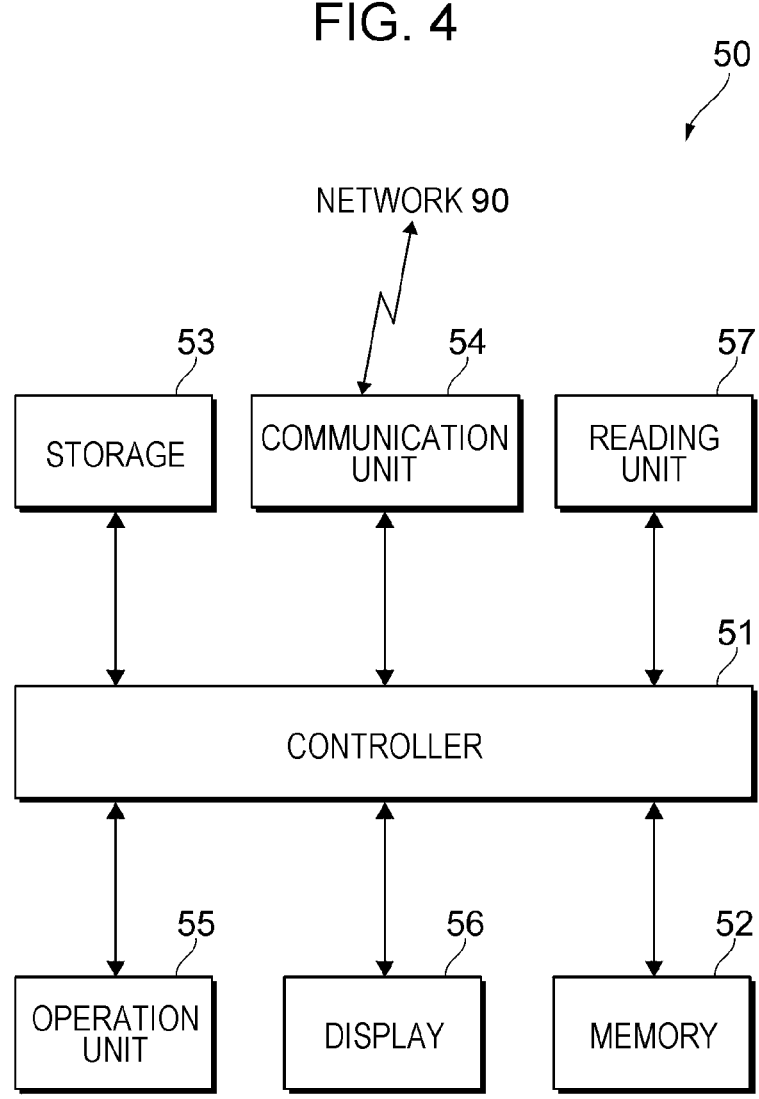
FIG. 4 is a diagram illustrating the hardware configuration of a user terminal.

The reading unit 17 reads a code serving as an identification displayed on a display 56 of the user terminal 50 (see FIG. 4). The reading unit 17 also reads an image formed on the paper sheet serving as a recording medium. The reading unit 17 is configured as, for example, a QR code (registered trademark) reader or a scanner. For example, a charge coupled device (CCD) system or a contact image sensor (CIS) system is used for the reading unit 17. In the CCD system, light beams radiated from the light source to the user terminal 50 and reflected from the user terminal 50 are reduced by a lens and received by CCDs. In the CIS system, light beams serially radiated from a light emitting diode (LED) light source to the user terminal 50 and reflected from the user terminal 50 are received.

The image forming unit 18 forms an image based on image information on the paper sheet as the recording medium and outputs the image by using, for example, what is called an electrophotographic system in which a toner image is formed on the paper sheet or an inkjet system in which ink is jetted out onto the recording medium.

Hardware Configuration of Management Server

Figure 3:
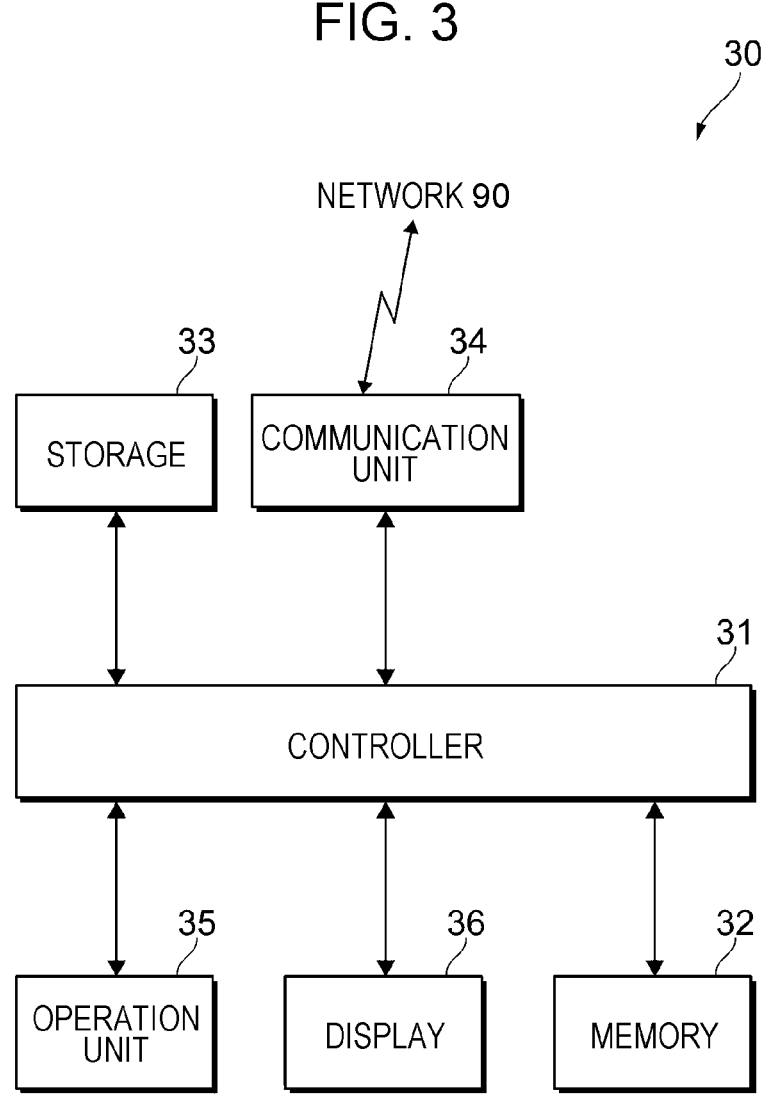
FIG. 3 is a diagram illustrating the hardware configuration of a management server.

FIG. 3 is a diagram illustrating the hardware configuration of the management server 30.

The management server 30 has the same components as the components except the reading unit 17 and the image forming unit 18 in the hardware configuration of the image processing apparatus 10 illustrated in FIG. 2. In other words, the management server 30 has a controller 31 configured as a processor such as a CPU, a memory 32 configured as a memory area such as a RAM, and a storage 33 configured as a memory area such as a HDD, a SDD, or a semiconductor memory. The management server 30 also has a communication unit 34 and an operation unit 35. The communication unit 34 transmits and receives data to and from the image processing apparatus 10, the user terminal 50, the settlement server 70, and the external apparatus via the network 90. The operation unit 35 is composed of a keyboard, a mouse, a touch panel, and other components. The management server 30 also has a display 36 composed of a liquid crystal display, an organic EL display, or the like. These components are connected via a data bus, an address bus, a PCI bus, or the like.

Hardware Configuration of User Terminal

FIG. 4 is a diagram illustrating the hardware configuration of the user terminal 50.

In the hardware configuration, the user terminal 50 has the same components as the components except the image forming unit 18 in the hardware configuration of the image processing apparatus 10 illustrated in FIG. 2 and thus has a controller 51, a memory 52, and a storage 53. The user terminal 50 also has a communication unit 54, an operation unit 55, and the display 56. The communication unit 54 transmits and receives data to and from the image processing apparatus 10, the management server 30, the settlement server 70, and the external apparatus via the network 90. These components are connected via a data bus, an address bus, a PCI bus, or the like.

Hardware Configuration of Settlement Server

The settlement server 70 has the same hardware configuration as that of the management server 30 illustrated in FIG. 3. The illustration and description of the hardware configuration of the settlement server 70 are thus omitted.

Functional Configuration of Controller of Image Processing Apparatus

Figure 5:
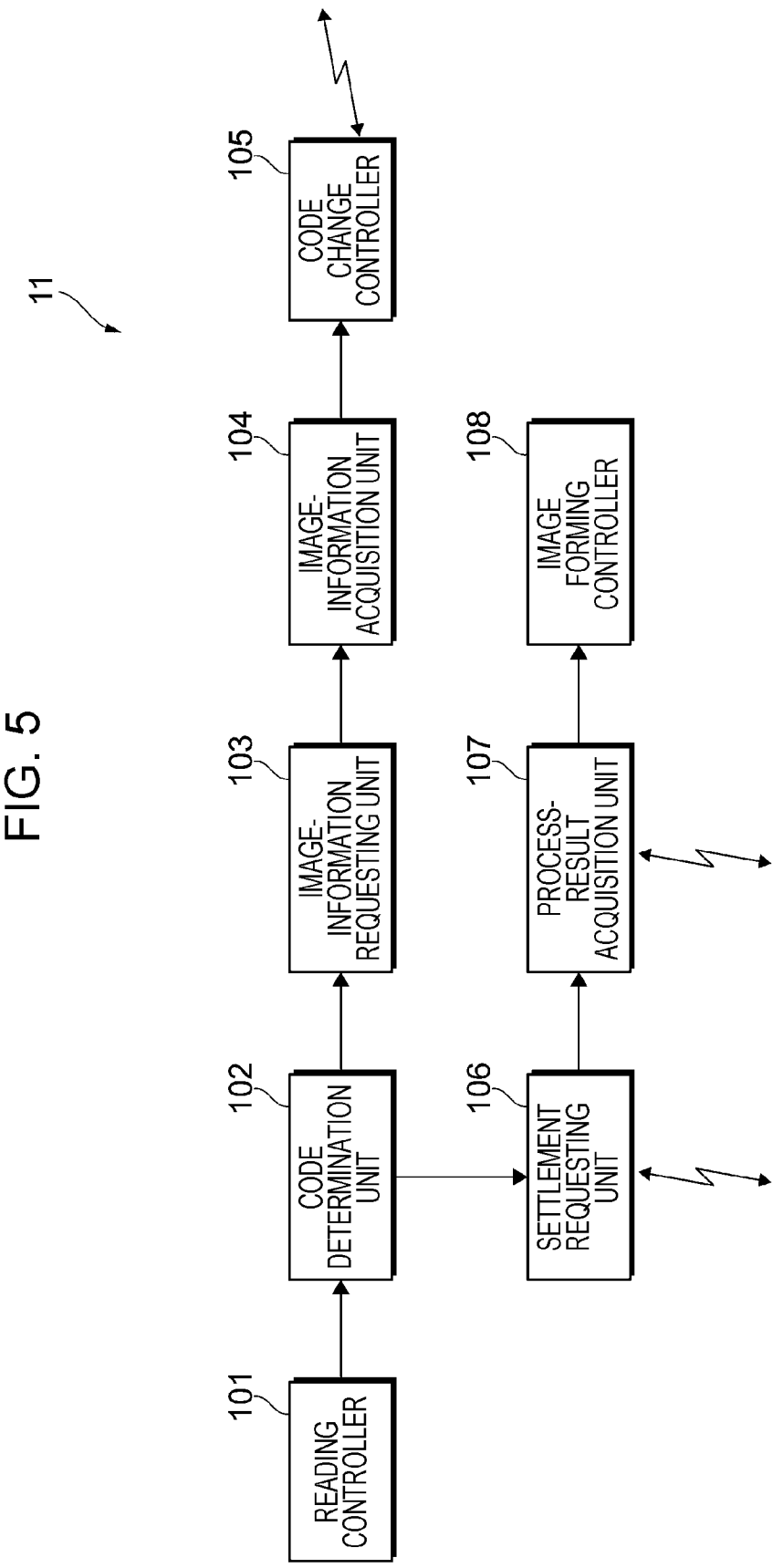
FIG. 5 is a diagram illustrating the functional configuration of a controller of the image processing apparatus.

FIG. 5 is a diagram illustrating the functional configuration of the controller 11 of the image processing apparatus 10.

In the controller 11 of the image processing apparatus 10, a reading controller 101, a code determination unit 102, an image-information requesting unit 103, an image-information acquisition unit 104, a code change controller 105, a settlement requesting unit 106, a process-result acquisition unit 107, and an image forming controller 108 function.

The reading controller 101 performs control of code reading by the reading unit 17. An identification is thereby acquired. Specifically, after the user terminal 50 having a code displayed thereon is held over the reading unit 17 through an action of the user U, the reading controller 101 performs the control to read the code displayed on the user terminal 50. The reading controller 101 may set the reading unit 17 to be ready to read an image forming process code any time such that the image forming process code is immediately readable in response to simply holding the user terminal 50 over the reading unit 17, without causing the user U to operate the image processing apparatus 10 (for example, without a touch panel operation).

The reading controller 101 may also set the reading unit 17 to be ready to read a code, for example, in response to: the user U operating the image processing apparatus 10; the user U not operating the image processing apparatus 10 within a predetermined period of time (for example, three minutes); a human sensor or the like detecting the user U present in front of the image processing apparatus 10, but this is not illustrated in the figures; or a photosensoror or the like detecting an object present above the reading unit 17.

The code determination unit 102 determines the code read by the reading controller 101. Specifically, the code determination unit 102 determines whether the code read by the reading unit 17 is an image forming process code or a settlement process code. A code determination method used by the code determination unit 102 is not limited to a particular method. For example, the code determination unit 102 determines a code on the basis of a feature specific to only an image forming process code, a feature specific to only a settlement process code, and the like.

If the code determination unit 102 determines that the code read by the reading controller 101 is an image forming process code, the image-information requesting unit 103 requests the management server 30 to transmit image information associated with the code. Specifically, the image-information requesting unit 103 transmits an image ID associated with the image forming process code to the management server 30 and thereby requests the management server 30 to transmit the image information associated with the image ID.

The image-information acquisition unit 104 acquires the image information transmitted from the management server 30 in response to the request by the image-information requesting unit 103. After the image-information acquisition unit 104 acquires the image information, the image information is held in the image processing apparatus 10 until the process result of a settlement process related to the image information performed by the settlement server 70 is transmitted.

After steps performed until the image information for the image forming process is held in the image processing apparatus 10 are terminated as steps for the image forming process code, the code change controller 105 performs control to change the code displayed on the user terminal 50. Specifically, the control is performed in such a manner as to: submit a change request to request the user terminal 50 to display a settlement process code changed from the image forming process code displayed on the display 56; and launch application software for displaying the settlement process code.

How the change request is submitted from the code change controller 105 to the user terminal 50 is not limited to a particular method, and any method may be used. However, from the viewpoint of convenience for the user U, an uncomplicated method not requiring effort is useful. For example, a contactless method not requiring advance negotiation such as pairing is thus appropriate. For example, the following methods may be used. In one method, information for wireless connection is associated in advance with the image forming process code, and thus the image processing apparatus 10 and the user terminal 50 are ready to perform wireless communicate with each. A change request is then transmitted through the wireless communication. In another method, a change request is transmitted by outputting a predetermined optical signal (for example, in a light emitting pattern) or outputting a predetermined sound signal (such as generating a sound). The methods as described above cause a code for the type of the process by the image processing apparatus 10 to be displayed on the user terminal 50 without a special operation by the user U.

If the code determination unit 102 determines that the code read by the reading unit 17 is a settlement process code, the settlement requesting unit 106 requests the settlement server 70 to execute the settlement process based on the settlement information associated with the code, in control of the execution of the settlement process. Specifically, the settlement requesting unit 106 transmits, to the settlement server 70, a settlement ID associated with the settlement process code and requests the settlement server 70 to execute the settlement process based on the settlement information associated with the settlement ID.

In the control of the execution of the settlement process, the settlement requesting unit 106 reports the details of the settlement process to the user U before requesting the settlement server 70 to execute the settlement process. Specifically, to prevent an error in the settlement process, the settlement requesting unit 106 reports, to the user U, information such as a settlement amount and a payment method as the details of the settlement process before requesting the settlement server 70 to execute the settlement process. For example, information regarding the settlement amount and the payment method corresponding to the details of the settlement process and a confirmation button pressable by the user U may be displayed on the display 56 of the user terminal 50.

After information indicating the completion of the settlement process is transmitted from the settlement server 70, the process-result acquisition unit 107 acquires the information. After the information indicating the completion of the settlement process is acquired by the process-result acquisition unit 107, the information is displayed, for example, on the display 16 of the image processing apparatus 10 or the display 56 of the user terminal 50 such that the user U who has used the printing service comprehends the information.

After the process-result acquisition unit 107 acquires the information indicating the completion of the settlement process, the image forming controller 108 performs control to cause the image forming unit 18 to form an image on the paper sheet as a recording medium on the basis of the image information held in the image processing apparatus 10.

Functional Configuration of Management Server

Figure 6:
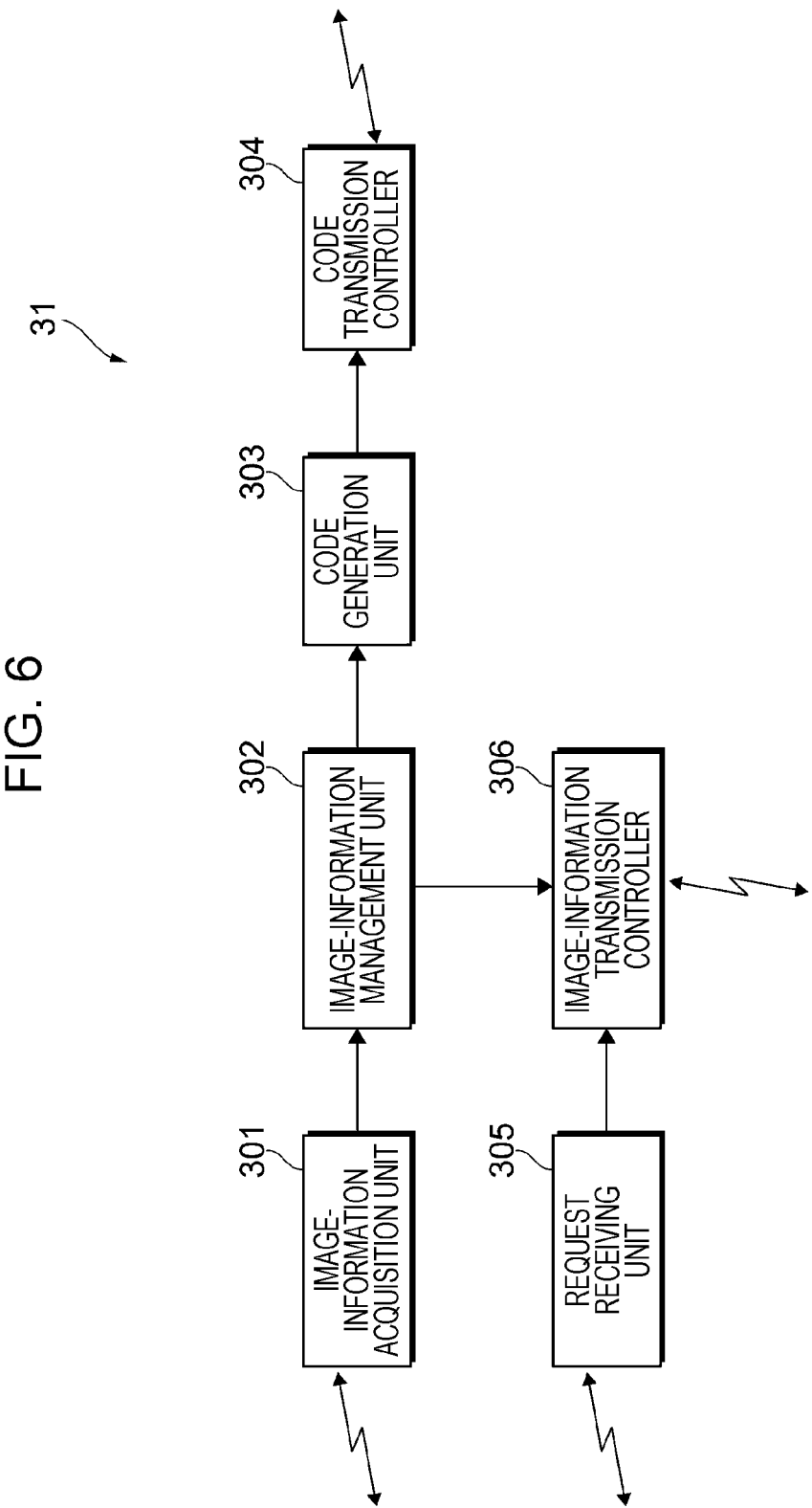
FIG. 6 is a diagram illustrating the functional configuration of a controller of the management server.

FIG. 6 is a diagram illustrating the functional configuration of the controller 31 of the management server 30.

In the controller 31 of the management server 30, an image-information acquisition unit 301, an image-information management unit 302, a code generation unit 303, a code transmission controller 304, a request receiving unit 305, an image-information transmission controller 306 function.

The image-information acquisition unit 301 acquires the image information provided from the user terminal 50. How the image-information acquisition unit 301 acquires the image information is not limited to a particular method. For example, the image-information acquisition unit 301 may acquire the image information uploaded from the user terminal 50 to a cloud server by the user U who uses a cloud image storage service separately provided by the management server 30. The image-information acquisition unit 301 may acquire, for example, the image information transmitted from the user terminal 50 via the network 90. The image-information acquisition unit 301 may also acquire the image information provided from the user terminal 50, by a data exchange method using a communication mode such as the infrared-ray communication mode.

The image-information management unit 302 manages the image information acquired by the image-information acquisition unit 301 after storing the image information in the database of the storage 33. Specifically, the image-information management unit 302 manages the image information acquired by the image-information acquisition unit 301 in association with an image ID. It suffices that the image ID and the image information are managed in association with each other. The image ID and the image information are not necessarily required to be paired when being stored in the database. For example, the image information may be stored in a predetermined storage area of the storage 33, and the file path to the image information and the image ID may be paired and stored in the database of the storage 33.

The code generation unit 303 generates a code serving as an identification associated with the image information managed by the image-information management unit 302. Specifically, the code generation unit 303 generates an image forming process code associated with the image ID and the image information managed by the image-information management unit 302. The code transmission controller 304 performs control to transmit the code generated by the code generation unit 303 to the user terminal 50.

The request receiving unit 305 receives the image information request from the image processing apparatus 10. Specifically, the request receiving unit 305 receives the image ID transmitted in the image information request from the image processing apparatus 10.

In response to the request from the image processing apparatus 10, the image-information transmission controller 306 performs control to transmit, to the image processing apparatus 10, the image information managed by the image-information management unit 302. Specifically, the image-information transmission controller 306 performs control to extract the image information associated with the image ID received by the request receiving unit 305 from the database of the storage 33 and to transmit the image information to the image processing apparatus 10.

Functional Configuration of User Terminal

Figure 7:
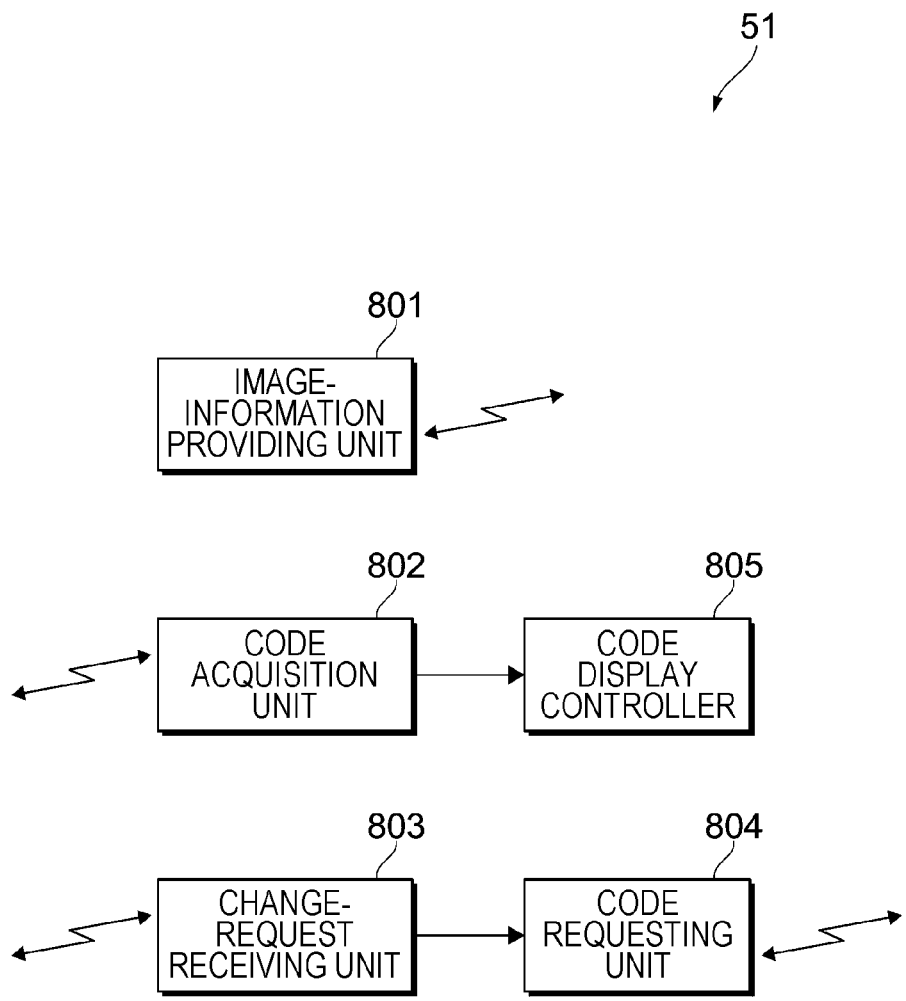
FIG. 7 is a diagram illustrating the functional configuration of a controller of the user terminal.

FIG. 7 is a diagram illustrating the functional configuration of the controller 51 of the user terminal 50.

In the controller 51 of the user terminal 50, an image-information providing unit 801, a code acquisition unit 802, a change-request receiving unit 803, a code requesting unit 804, and a code display controller 805 function.

The image-information providing unit 801 provides the management server 30 with the image information for the image forming process by the image processing apparatus 10. How the image-information providing unit 801 provides the management server 30 with the image information is not limited to a particular method. For example, the image-information providing unit 801 may perform control to upload an image to the cloud image storage server separately provided by the management server 30, in accordance with an image registration operation by the user U.

For example, the image-information providing unit 801 may also perform control to transmit the image information to the management server 30 via the network 90, in accordance with an image registration operation by the user U. The image-information providing unit 801 may also perform control to transmit the image information to the management server 30 by a data exchange method using a communication mode such as the infrared-ray communication mode. In this exemplary embodiment, the image registration operation by the user U uses application software specifically for the printing service that is installed in advance in the user terminal 50, a website specifically for the printing service that is accessible by using the browser function of the user terminal 50, or the like.

The code acquisition unit 802 acquires the image forming process code transmitted from the management server 30. The image forming process code acquired by the code acquisition unit 802 is stored in the storage 53 to be displayable any time on the display 56. The code acquisition unit 802 also acquires the settlement process code transmitted from the settlement server 70. The settlement process code acquired by the code acquisition unit 802 is stored in the storage 53 to be displayable any time on the display 56.

The change-request receiving unit 803 receives the change request from the image processing apparatus 10. Specifically, the change-request receiving unit 803 receives a request for displaying the settlement process code changed from the image forming process code displayed on the display 56 of the user terminal 50.

After the change-request receiving unit 803 receives the change request, the code requesting unit 804 requests the settlement server 70 to transmit the settlement process code.

The code display controller 805 performs control to display a code acquired by the code acquisition unit 802 on the display 56. Specifically, the code display controller 805 performs control to display any of the image forming process code and the settlement process code on the display 56. After the change-request receiving unit 803 receives the change request, the code display controller 805 performs control to display the settlement process code changed from the image forming process code displayed on the display 56.

Process by Image Processing Apparatus

Figure 8:
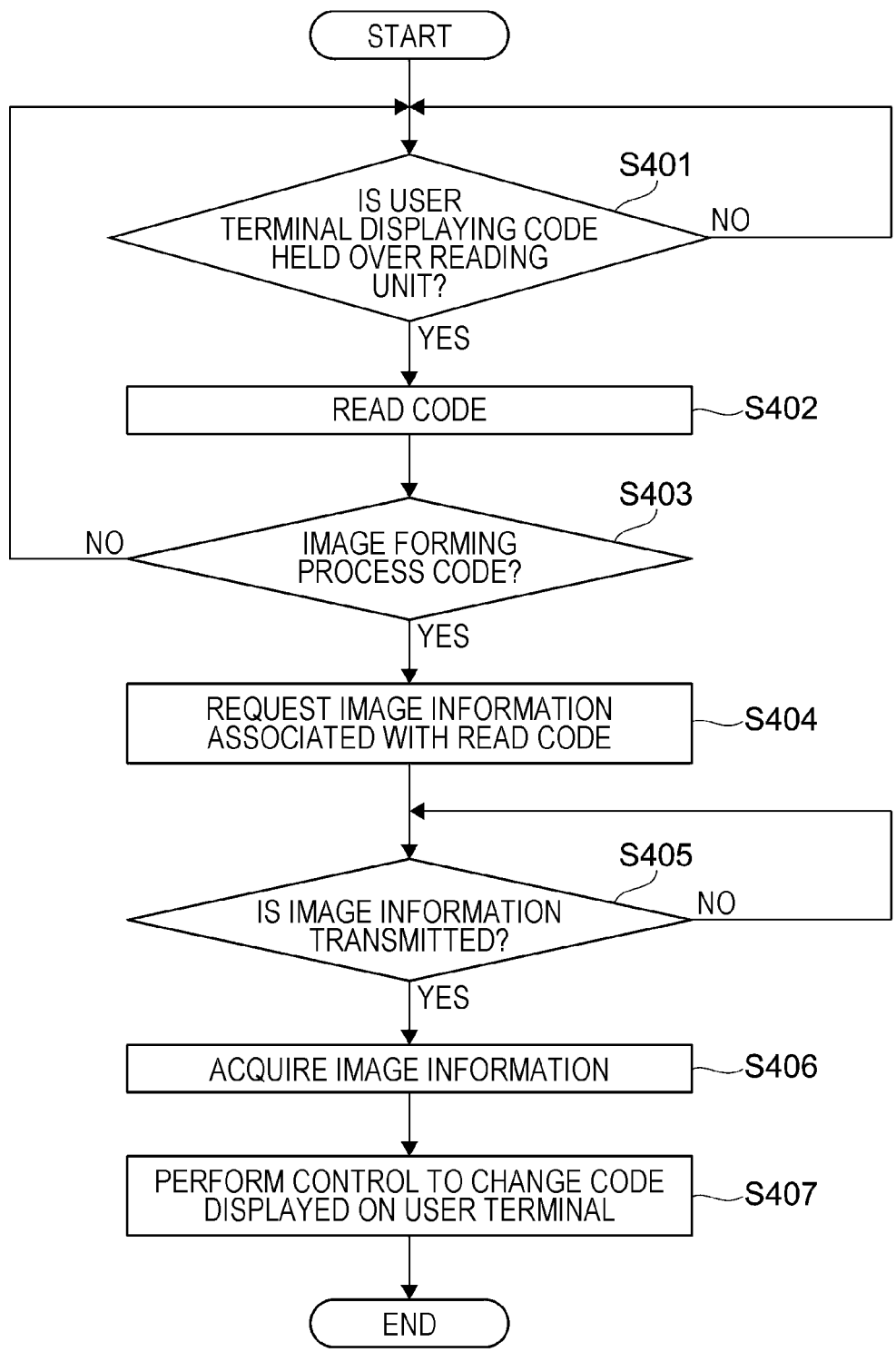
FIG. 8 is a flowchart illustrating steps performed in a process executed by the image processing apparatus until control to change a code displayed on the user terminal is performed.

FIG. 8 is a flowchart illustrating steps performed in a process by the image processing apparatus 10 until the control to change a code displayed on the user terminal 50 is performed.

If the user U operating the user terminal 50 holds the user terminal 50 displaying a code over the reading unit 17 of the image processing apparatus 10 (YES in step S401), the image processing apparatus 10 reads the code displayed on the user terminal 50 (step S402). In contrast, if the user terminal 50 displaying a code is not held over the reading unit 17 (NO in step S401), the image processing apparatus 10 repeats step S401 until the user terminal 50 displaying a code is held over the reading unit 17.

If the code read by the image processing apparatus 10 is an image forming process code (YES in step S403), the image processing apparatus 10 requests the management server 30 to transmit image information associated with the read code (step S404). Specifically, by using an image ID associated with the image forming process code, the image processing apparatus 10 requests the management server 30 to transmit the image information associated with the image ID. In contrast, if the code read by the image processing apparatus 10 is not an image forming process code (NO in step S403), the process returns to step S401. At this time, the image processing apparatus 10 may provide the user U with a help for displaying the image forming process code on the user terminal 50.

If the image information is transmitted from the management server 30 (YES in step S405), the image processing apparatus 10 acquires the image information (step S406) and performs control to change the code displayed on the user terminal 50 (step S407). Specifically, the image processing apparatus 10 performs submitting, to the user terminal 50, a change request to display a settlement process code changed from the image forming process code displayed on the user terminal 50, control to launch application software for displaying the settlement process code, and the like. In contrast, if image information is not transmitted from the management server 30 (NO in step S405), the image processing apparatus 10 repeats step S405 until the image information is transmitted from the management server 30.

Figure 9:
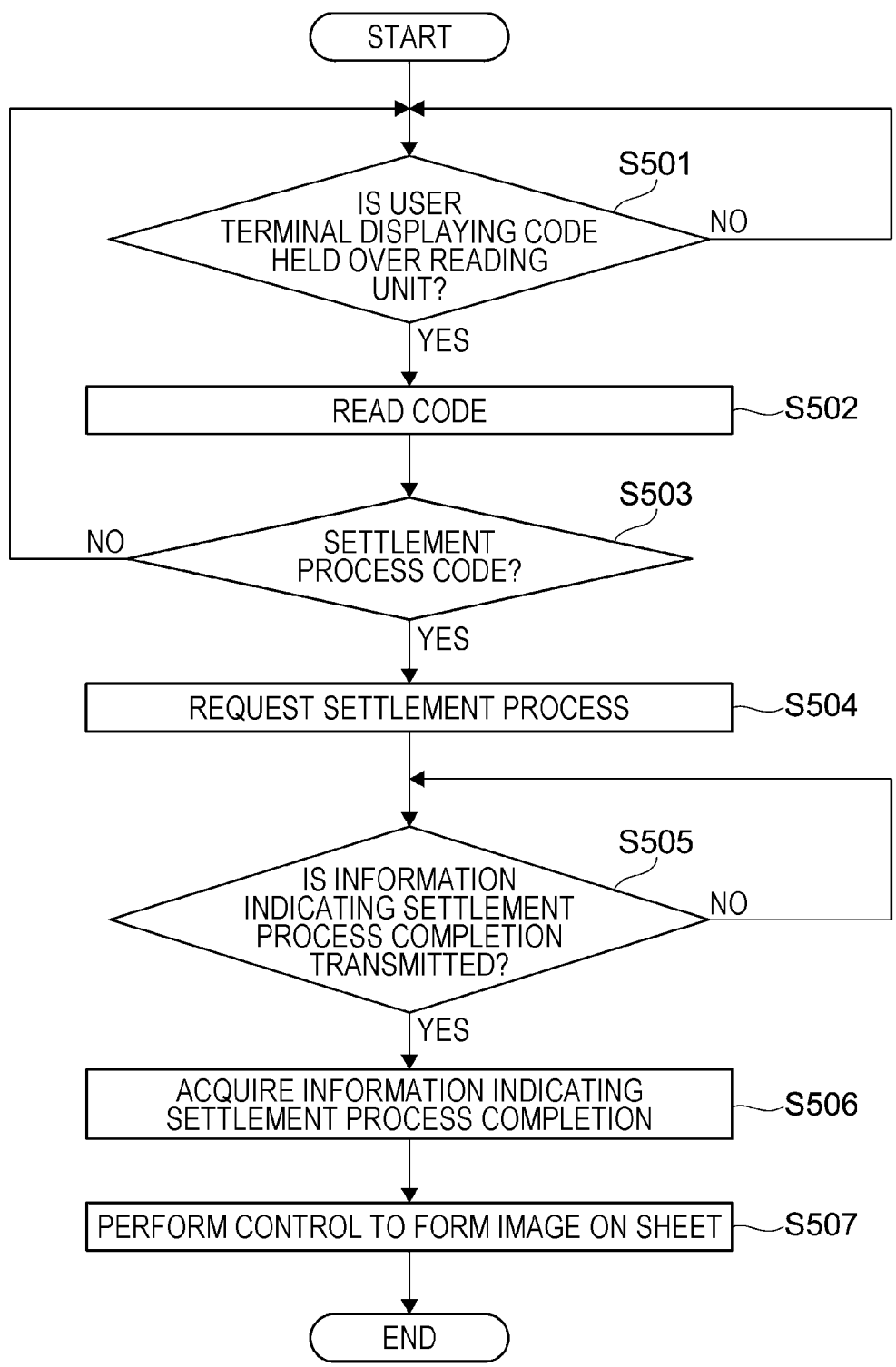
FIG. 9 is a flowchart illustrating steps performed in the process by the image processing apparatus after the control to change the code displayed on the user terminal is performed.

FIG. 9 is a flowchart illustrating steps performed in the process by the image processing apparatus 10 after the control to change the code displayed on the user terminal 50 is performed.

If the user U holds the user terminal 50 displaying the code over the reading unit 17 of the image processing apparatus 10 after the image processing apparatus 10 performs the control to change the code displayed on the user terminal 50 (YES in step S501), the image processing apparatus 10 reads the code displayed on the user terminal 50 (step S502). In contrast, if the user terminal 50 displaying the code is not held over the reading unit 17 (NO in step S501), the image processing apparatus 10 repeats step S501 until the user terminal 50 displaying the code is held over the reading unit 17.

If the code read by the image processing apparatus 10 is a settlement process code (YES in step S503), the image processing apparatus 10 requests the settlement server 70 to execute a settlement process based on the settlement information associated with the read code (step S504). Specifically, by using a settlement ID associated with the settlement process code, the image processing apparatus 10 requests the settlement server 70 to execute a settlement process based on the settlement information associated with the settlement ID. In contrast, if the image processing apparatus 10 is not a settlement process code (NO in step S503), the process returns to step S501.

If information indicating the completion of the settlement process is transmitted from the settlement server 70 (YES in step S505), the image processing apparatus 10 acquires the information (step S506) and performs control to cause the image forming unit 18 to form an image on the paper sheet as a recording medium on the basis of the image information held in the image processing apparatus 10 (step S507), and then the process by the image processing apparatus 10 is terminated. In contrast, if information indicating the completion of the settlement process is not transmitted from the settlement server 70 (NO in step S505), the image processing apparatus 10 repeats step S505 until the information indicating the completion of the settlement process is transmitted from the settlement server 70.

Process by Management Server

Figure 10:
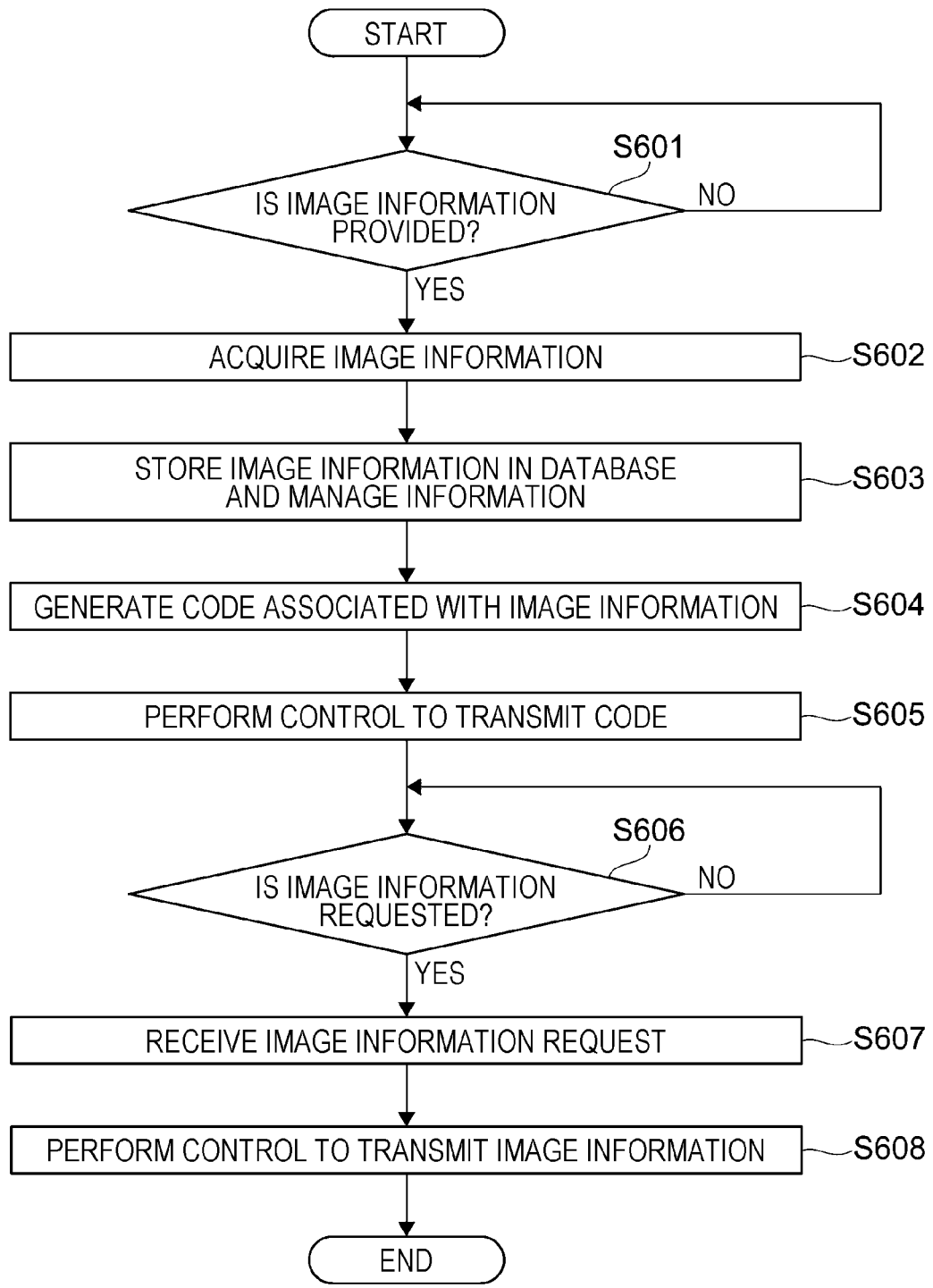
FIG. 10 is a flowchart illustrating a process by the management server.

FIG. 10 is a flowchart illustrating a process by the management server 30.

If the image information for the image forming process by the image processing apparatus 10 is provided from the user terminal 50 (YES in step S601), the management server 30 acquires the image information (step S602) and manages the image information after storing the image information in the database (step S603). Specifically, the management server 30 manages the acquired image information in association with an image ID. In contrast, if the image information is not transmitted from the user terminal 50 (NO in step S601), the management server 30 repeats step S601 until the image information is transmitted from the user terminal 50.

The management server 30 generates a code serving as an identification associated with the image information stored in the database and managed (step S604) and performs control to transmit the code to the user terminal 50 (step S605). Specifically, the management server 30 generates the image forming process code that is associated with the managed image information and the image ID and performs control to transmit the code to the user terminal 50.

If the image processing apparatus 10 having read the image forming process code displayed on the user terminal 50 transmits an information request for the image information (YES in step S606), the management server 30 receives the image information request (step S607) and performs control to transmit the image information to the image processing apparatus 10 (step S608), and then the process by the management server 30 is terminated. In contrast, if the image processing apparatus 10 does not transmit an image information request (NO in step S606), the management server 30 repeats step S606 until the image processing apparatus 10 transmits an image information request.

Process by User Terminal

Figure 11:
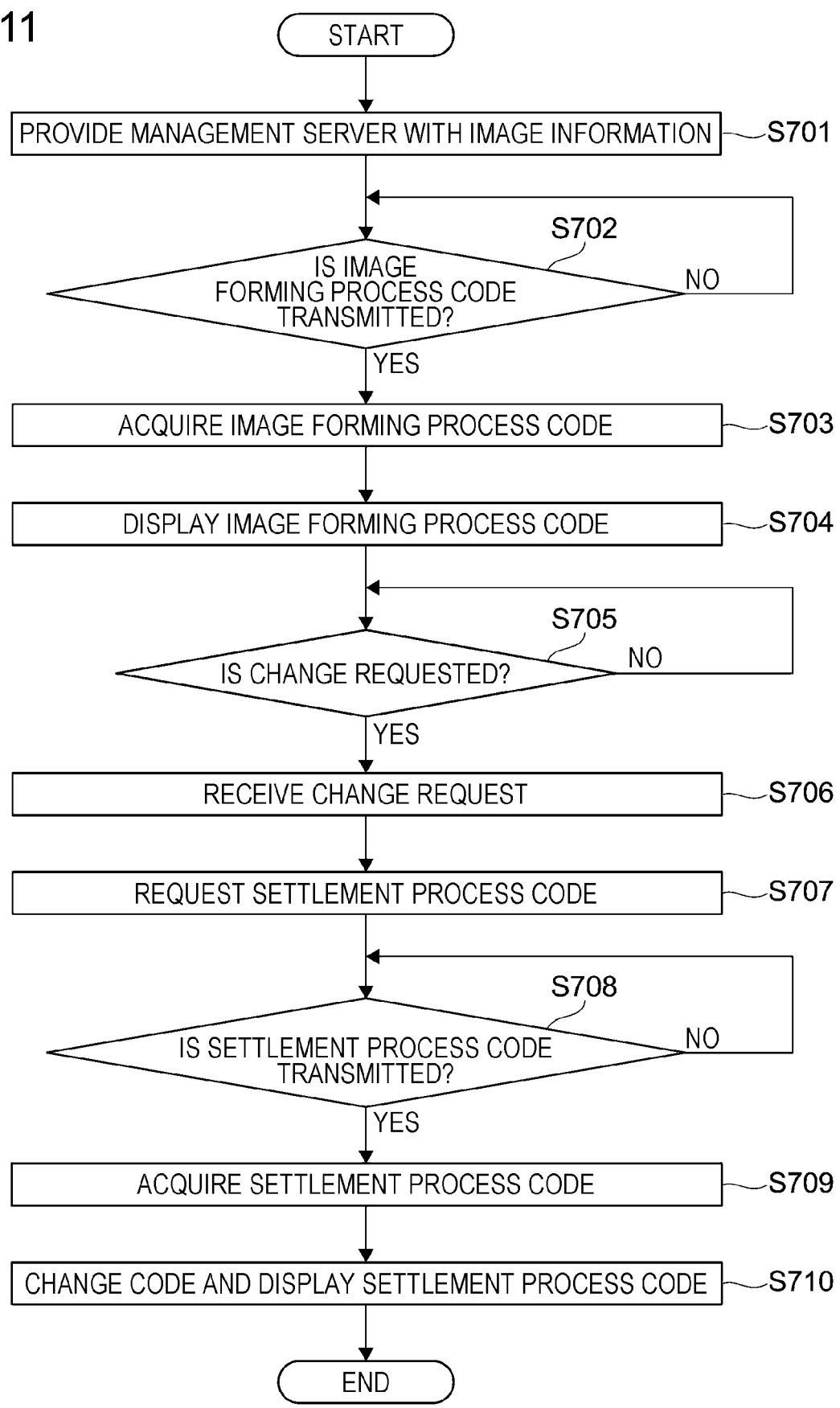
FIG. 11 is a flowchart illustrating a process by the user terminal.

FIG. 11 is a flowchart illustrating a process by the user terminal 50.

The user terminal 50 provides the management server 30 with the image information for the image forming process by the image processing apparatus 10 (step S701).

If the image forming process code is transmitted from the management server 30 (YES in step S702), the user terminal 50 acquires the image forming process code (step S703). The user terminal 50 then displays the image forming process code on the basis of the operation by the user U (step S704). This enables the image processing apparatus 10 to read the image forming process code. In contrast, if the image forming process code is not transmitted from the management server 30 (NO in step S702), the user terminal 50 repeats step S702 until the image forming process code is transmitted from the management server 30. When displaying the image forming process code, the user terminal 50 may perform processing such as increasing the brightness of the display 56 or adjusting the size of the displayed image forming process code to help the image processing apparatus 10 to read the image forming process code easily.

If the image processing apparatus 10 acquires the image information associated with the image forming process code and submits a change request to the user terminal 50 (YES in step S705), the user terminal 50 receives the change request (step S706) and requests the settlement server 70 to transmit the settlement process code (step S707). In contrast, if the image processing apparatus 10 does not submit a change request (NO in step S705), the user terminal 50 repeats step S705 until a change request is submitted.

In a case where there are multiple images left to be printed collectively even after the user terminal 50 receives the change request from the image processing apparatus 10, the display 56 displaying an image forming process code may be held over the reading unit 17 again. In this case, the image forming process codes are stacked in series in the image processing apparatus 10 until the display 56 displaying the settlement process code is held over the reading unit 17. In response to holding the display 56 displaying the settlement process code over the reading unit 17, control of a settlement process associated with all of the stacked image forming process codes is performed.

If the settlement process code is transmitted from the settlement server 70 (YES in step S708), the user terminal 50 acquires the settlement process code (step S709) and displays the settlement process code changed from the image forming process code (step S710). This enables the image processing apparatus 10 to read the settlement process code. The process by the user terminal 50 is then terminated. In contrast, if the settlement process code is not transmitted from the settlement server 70 (NO in step S708), the user terminal 50 repeats step S708 until the settlement process code is transmitted from the settlement server 70.

Specific Examples

Figure 12:
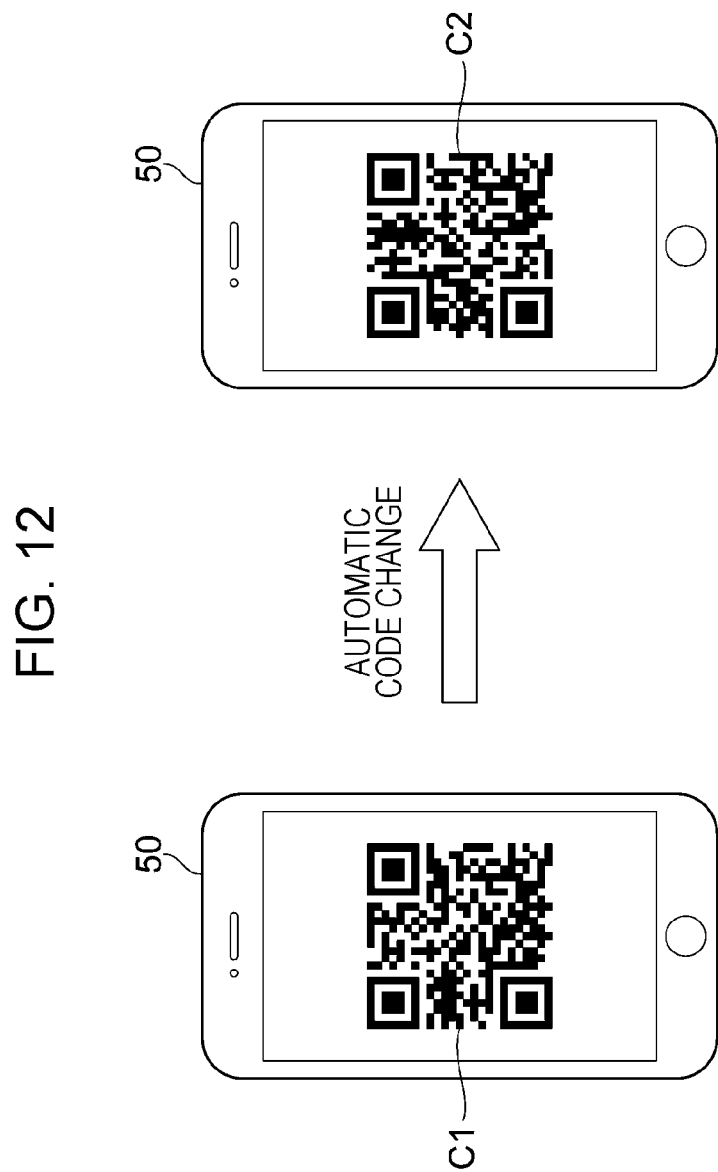
FIG. 12 is a view illustrating an automatic change of identifications displayed on the display of the user terminal.

FIG. 12 is a view illustrating an automatic change of identifications displayed on the display 56 of the user terminal 50.

As described above, after the image information for the image forming process is provided to the management server 30, the image forming process code generated by the management server 30 is transmitted to the user terminal 50 and then displayed on the user terminal 50. FIG. 12 illustrates, as a specific example of the image forming process code, a code C1 for the image forming process displayed on the user terminal 50. In the example in FIG. 12, the image forming process code C1 is a QR code (registered trademark).

After the user U holds the user terminal 50 displaying the image forming process code C1 over the reading unit 17 of the image processing apparatus 10, the image processing apparatus 10 reads the code C1, requests image information associated with the code C1, and acquires the image information. The image processing apparatus 10 then submits, to the user terminal 50, a change request to display a settlement process code changed from the code C1 displayed on the user terminal 50.

After the user terminal 50 receives the change request, the user terminal 50 requests the settlement server 70 to transmit the settlement process code. The settlement server 70 then transmits the settlement process code to the user terminal 50, and the user terminal 50 displays the settlement process code. FIG. 12 illustrates, as a specific example of the settlement process code, a code C2 for the settlement process displayed on the user terminal 50. In the example in FIG. 12, the settlement process code C2 is a QR code (registered trademark) like the code C1. The code C1 displayed on the user terminal 50 is thus automatically changed to the settlement process code C2. This consequently enables a simplified operation for serial execution of multiple types of processes compared with a case where an operation is performed for every process.

FIG. 13 is a table illustrating a specific example of the image information stored in the database of the storage 33 of the management server 30.

After the user terminal 50 provides the management server 30 with image information for an image forming process by the image processing apparatus 10, the management server 30 manages the image information after storing the image information in the database of the storage 33 in association with an image ID. FIG. 13 illustrates three pieces of image information as an example of the image information stored in the database of the storage 33 of the management server 30. Each piece of image information has items of an image ID, a storage place and a file name, an output sheet size, a color mode, and the number of print copies.

Specifically, FIG. 13 illustrates a piece of image information indicating the image ID "00000001", the storage place and the file name "D:\Data\00000001.pdf", the output sheet size "A4", the color mode "Color", and the number of print copies "1"; a piece of image information indicating the image ID "00000002", the storage place and the file name "D:\Data\00000002.xdw", the output sheet size "A3", the color mode "Mono" (monochrome), and the number of print copies "15"; and a piece of image information indicating the image ID "00000003", the storage place and the file name "D:\Data\00000003.jpeg", the output sheet size "L", the color mode "Color", and the number of print copies "1". The image processing apparatus 10 acquires the image information having these items and thereby may execute the image forming process.

This exemplary embodiment has heretofore been described; however, the present disclosure is not limited to this exemplary embodiment described above. In addition, effects of the present disclosure are not limited to those of this exemplary embodiment above. For example, the system configuration illustrated in FIG. 1 and the hardware configurations respectively illustrated in FIGS. 2 to 4 are merely examples of the present disclosure, and the configuration of the disclosure is not particularly limited to these configurations. The functional configurations respectively illustrated in FIGS. 5 to 7 are also examples, and the configuration of the disclosure is not particularly limited to these configurations. It suffices that the information processing system 1 in FIG. 1 has a function capable of executing the above-described processes as a whole, and the functional configuration to implement the function is not limited to the examples in FIGS. 5 to 7.

The order of steps in each process illustrated in a corresponding one of FIGS. 8 to 11 is merely an example, and the order of steps in each process in the present disclosure is not particularly limited to the order above. The processes executed in a time series in the order of the illustrated steps may be executed in parallel or separately. Even if the processes are not executed in a time series, the processes may be executed in parallel or separately. The screens illustrated in FIG. 12 are merely examples of screens displayed when QR codes (registered trademark) serving as identifications are displayed on the user terminal 50, and screens of the present disclosure are not particularly limited to the screens above. Each identification may be displayed on the user terminal 50 in any manner as long as the identification is readable by the image processing apparatus 10.

For the exemplary embodiment above, the configurations and processes implemented in the case where the image processing apparatus 10 provides the printing service have been described; however, the configurations and the processes are merely examples. The present disclosure is applicable to continuously performed reading of respective identifications for a process for providing a different fee-charging service (such as the copying service, the scanning service, or the faxing service) provided by the image processing apparatus 10 and for the settlement process for the service fee thereof.

In a case where among different fee-charging services provided by the image processing apparatus 10, the user U uses the copying service, the scanning service, and the faxing service in relation with each other, for example, the following process is implemented. First, the user U uses the copying service. The user U prints an image brought with the user U and revises the printed image such as by correcting the image. Next, the user U uses the scanning service and scans the revised image. Lastly, the user U uses the faxing service and transmits the image resulting from the scanning. These processes are applied to use cases such as submitting an application form for an insurance service or the like and submitting a homework print or the like by a student who takes an on-line class.

In these use cases, a service fee is charged for the use of each of the copying service, the scanning service, and the faxing service, and each service fee is charged to one user U on occasions. In this case, the user terminal 50 stores therein a settlement process code acquired from the settlement server 70 for the settlement of the service fee of the printing service and displays the same settlement process code in each settlement of a corresponding one of the service fee of the scanning service and the service fee of the faxing service. This eliminates the need to acquire a settlement process code from the settlement server 70 in each of the processes for the respective three fee-charging services and thus simplifies the processes.

In the case where multiple processes considered to have mutual relevance are executed as in these use cases, the presence of the relevance is determined on the basis of, for example, whether the service fees are charged to one user, whether a settlement process code is displayed multiple times on one user terminal 50, or whether multiple processes (such as printing, reading, and transmitting) are executed on the same recording medium. Among these cases, whether multiple processes are executed on the same recording medium may be determined, for example, by using the following method. First, the image subjected to the copying service (for example, the image brought with the user U) is read and held as image information. The degree of similarity or the like between the held image information and the image information regarding the image read later in the scanning service (for example, the image revised by the user U) is calculated. Whether the image read in the scanning service corresponds to the image revised from the image subjected to the copying service is then determined on the basis of the calculated degree of similarity.

In the exemplary embodiment above, the size of a recording medium as an output target, a color mode used in forming an image, and the number of output print copies are cited as the information required to form an image on a recording medium but are merely examples. An enlargement ratio, setting information for so-called N-up, and the like may be included in the information.

In the configuration of the exemplary embodiment, the image forming process code serving as the first identification required to execute the image forming process serving as the first process is automatically changed to the settlement process code serving as the second identification required to execute the settlement process serving as the second process, and the settlement process code is displayed on the user terminal 50. However, the configuration is merely an example. The second process to a (2+n)th process (n is an integer value of 1 or higher) may be executed. For example, the following configuration may be used. Specifically, a code as a first identification, a code as a second identification, and a code as a third identification that are respectively required to execute a first process, a second process, and a third process are automatically changed and displayed on the user terminal 50 one after another.

In the exemplary embodiment above, the user U is required to perform an operation for displaying the image forming process code on the user terminal 50, but the need for the operation by the user U may be eliminated. For example, the image forming process code may be displayed automatically on the user terminal 50 in the following manner. Specifically, in response to holding the user terminal 50 not displaying the image forming process code over the reading unit 17 of the image processing apparatus 10, a change request is submitted by the image processing apparatus 10, and control of application software is performed.

In the configuration of the exemplary embodiment above, a code displayed on the user terminal 50 is automatically changed from an image forming process code to a settlement process code; however, the configuration is merely an example. For example, in a case where a fee-charging service based on a full prepayment system is used, a code displayed on the user terminal 50 may be automatically changed from a settlement process code to an image forming process code.

In the exemplary embodiment above, the management server 30 generates an image forming process code; however, this is merely an example. For example, the user terminal 50 may generate an image forming process code after acquiring an image ID from the management server 30.

In the configuration of the exemplary embodiment above, an image forming process code is generated by the management server 30, transmitted to the user terminal 50, and stored in the user terminal 50; however, the configuration is merely an example. For example, the user terminal 50 may hold information for accessing an image forming process code for causing the image processing apparatus 10 to execute an image forming process. In this case, the user terminal 50 may access the image forming process code at a time to display the image forming process code and then display the image forming process code on the display 56.

In the exemplary embodiment above, a code such as a QR code (registered trademark) is used as an identification displayed on the user terminal 50; however, this is merely an example. It suffices that the identification is any identification that enables the image processing apparatus 10 to execute the various processes such as the image forming process and the settlement process, and thus the identification may be, for example, a symbol.

In the configuration of the exemplary embodiment above, in the aspect in which the image processing apparatus 10 acquires the identification output from the user terminal 50, the image processing apparatus 10 reads a code serving as the identification displayed on the display 56 of the user terminal 50; however, this is merely an example. In an aspect other than the aspect in which the image processing apparatus 10 reads the identification displayed on the user terminal 50, for example, the image processing apparatus 10 may receive the identification transmitted from the user terminal 50.

In addition, the user terminal 50 providing the management server 30 with image information may be identical to or different from the user terminal 50 displaying an image forming process code and a settlement process code. For example, the user U may create an image by using a personal computer serving as a user terminal 50 installed in the home of the user U, provide the management server 30 with image information regarding the image, and then cause a smartphone serving as a user terminal 50 of the user U to display an image forming process code and a settlement process code.

In the configuration of the exemplary embodiment above, the reading unit 17 of the image processing apparatus 10 reads an image forming process code displayed on the display 56 of the user terminal 50; however, the configuration of the present disclosure is not limited to this configuration. For example, the image processing apparatus 10 may display, on the display 16, an image forming process code acquired from the management server 30, and a reading unit 57 of the user terminal 50 may read the code. In this case, the user terminal 50 acquires in advance the image forming process code and a settlement process code from the management server 30 and the settlement server 70, respectively, and manages the two codes after storing the codes in the storage 53 in association with each other. After reading the image forming process code displayed on the display 16 of the image processing apparatus 10, the user terminal 50 extracts the same image forming process code stored in the storage 53, and displays, on the display 56, the settlement process code associated with the image forming process code. In response to the user U holding the user terminal 50 displaying the settlement process code over the reading unit 17 of the image processing apparatus 10, the reading unit 17 reads the settlement process code. This causes the image processing apparatus 10 to request the settlement server 70 to execute a settlement process.

In the configuration of the exemplary embodiment above, an identification for executing the image forming process by the image processing apparatus 10 and an identification for executing the settlement process are output from the user terminal 50; however, the configuration is merely an example. For example, an identification for a process for giving points to a customer in a point of sale (POS) system and an identification for shopping settlement may be output from the user terminal 50.

In the exemplary embodiment above, the image processing apparatus 10 performs the control to cause the user terminal 50 to display a settlement process code. However, for example, in accordance with an instruction or a request from the image processing apparatus 10, the user terminal 50 may display by itself a settlement process code stored in advance in the user terminal 50.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
in response to reading a first identification displayed on a screen of a different information processing apparatus, perform control of execution of a first process;
in response to completion of the first process, cause a second identification to be displayed on the screen of the different information processing apparatus such that the first identification is replaced by the second identification on the screen of the different information processing apparatus; and
in response to reading the second identification displayed on the screen of the different information processing apparatus, perform control of execution of a second process.

2. The information processing apparatus according to claim 1,
wherein the processor is configured to:
determine a type of an read identification on a basis of information connected with the identification.

3. The information processing apparatus according to claim 2,
wherein the processor is configured to:
determine, as the information connected with the identification, the type of the identification on a basis of pieces of information respectively identifying the first process and the second process.

4. The information processing apparatus according to claim 1,
wherein the processor is configured to:
in the control of the execution of the second process, report a detail of the second process to a user before the execution of the second process.

5. The information processing apparatus according to claim 4,
wherein the processor is configured to:
when the second process is a settlement process for a fee of the first process, report a detail of the settlement process to the user before the execution of the settlement process in control of execution of the settlement process.

6. The information processing apparatus according to claim 1,
wherein the processor is configured to:
output a predetermined signal from the information processing apparatus to the different information processing apparatus in the control to cause the different information processing apparatus to display the second identification.

7. The information processing apparatus according to claim 6,
wherein the processor is configured to:
output, as the predetermined signal, at least one of a sound signal or an optical signal from the information processing apparatus to the different information processing apparatus.

8. The information processing apparatus according to claim 1,
wherein the processor is configured to:
in the control to cause the different information processing apparatus to display the second identification, perform control to launch application software by which the second process is executed in the different information processing apparatus.

9. The information processing apparatus according to claim 8,
wherein the processor is configured to:
in the control to cause the different information processing apparatus to display the second identification, perform control to cause the application software to display the second identification on the screen of the different information processing apparatus.

10. The information processing apparatus according to claim 1,
wherein the processor is configured to:
in control of execution of a plurality of processes having predetermined relevance, use one identification for executing a settlement process for respective fees of the plurality of processes.

11. The information processing apparatus according to claim 10,
wherein the processor is configured to:
in response to identifications for executing the plurality of processes being displayed on one apparatus serving as the different information processing apparatus, consider the plurality of processes to have the predetermined relevance and use the one identification for executing the settlement process for the respective fees of the plurality of processes.

12. The information processing apparatus according to claim 10,
wherein the processor is configured to:
when the first process and the second process of the plurality of processes are respectively a process for forming an image on a recording medium and a process related to the recording medium on which the image is formed, consider the plurality of processes to have the predetermined relevance and use the one identification for executing the settlement process for the respective fees of the plurality of processes.

13. The information processing apparatus according to claim 1,
wherein the processor is configured to:
in response to the completion of the first process, perform control to cause the different information processing apparatus to serially display, at predetermined timing, the second identification to a (2+n)th (n is an integer value of 1 or higher) identification for respectively executing the second process to a (2+n)th process; and
in response to acquiring the second identification to the (2+n)th identification that are serially displayed on the different information processing apparatus, perform control of execution of each of the second process to the (2+n)th process.

14. The information processing apparatus according to claim 1,
wherein the processor is configured to:
in response to reading, as the first identification displayed from the different information processing apparatus, an identification for executing an image forming process for forming an image on a recording medium, perform control of execution of the image forming process; and
in response to completion of the image forming process, perform control to cause the different information processing apparatus to display, as the second identification, an identification for executing a settlement process for a fee of the first process, the settlement process serving as the second process.

15. The information processing apparatus according to claim 1,
wherein the first identification and the second identification displayed on the screen of the different information processing apparatus are machine-readable codes.

16. An information processing method comprising:
in response to reading a first identification displayed on a screen of a different information processing apparatus, performing control of execution of a first process;
in response to completion of the first process, causing a second identification to be displayed on the screen of the different information processing apparatus such that the first identification is replaced by the second identification on the screen of the different information processing apparatus; and
in response to reading the second identification displayed on the screen of the different information processing apparatus, performing control of execution of a second process.

17. A non-transitory computer readable medium storing a program causing a computer to execute a process comprising:
in response to reading a first identification displayed on a screen of a different information processing apparatus, performing control of execution of a first process;
in response to completion of the first process, causing a second identification to be displayed on the screen of the different information processing apparatus such that the first identification is replaced by the second identification on the screen of the different information processing apparatus; and
in response to reading the second identification displayed on the screen of the different information processing apparatus, performing control of execution of a second process.

* * * * *